United States Patent [19]

Hamm

[11] 3,838,437
[45] Sept. 24, 1974

[54] PHOTOGRAPHIC LENS ADAPTER RING FOR INTERCHANGEABLE LENSES
[75] Inventor: Heinz Hamm, Braunschweig, Germany
[73] Assignee: Rollei-Werke Franke & Heidecke, Braunschweig, Germany
[22] Filed: May 23, 1973
[21] Appl. No.: 363,269

[30] Foreign Application Priority Data
June 21, 1972 Germany............................. 2230199
Jan. 5, 1972 Germany............................. 7300295

[52] U.S. Cl................................. 354/270, 354/286
[51] Int. Cl................................................ G03b 9/02
[58] Field of Search.......... 95/44 R, 42, 64 B, 64 R; 354/270, 272, 286

[56] References Cited
UNITED STATES PATENTS
2,830,513   4/1958   Sauer................................ 354/270
3,470,809   10/1969  Uchida............................... 95/64 R
3,765,315   10/1973  Hokari............................... 95/64 R Primary Examiner—Samuel S. Matthews
Assistant Examiner—E. M. O'Connor
Attorney, Agent, or Firm—Stonebraker & Shepard

[57] ABSTRACT

An adapter ring to enable interchangeable photographic lenses to be used with a camera somewhat different from the one for which they were specifically designed, and especially to enable operating parts within the lens unit to be operated from the control parts within the camera body, notwithstanding some differences. The adapter ring, in addition to serving as a mount to hold the interchangeable lens unit in position, contains a transmission ring structure which receives motion from the operating rod in the camera body (movable parallel to the optical axis) and transmits such motion to the operating rod in the lens unit, even though the operating rods may not be in exact axial alignment with each other. The transmission ring structure is resilient in an axial direction, so that the transmission rod in the camera body may move through its full range of movement even though the transmission rod in the lens unit may have a more limited range of movement.

5 Claims, 3 Drawing Figures

PATENTED SEP 24 1974

3,838,437

PHOTOGRAPHIC LENS ADAPTER RING FOR INTERCHANGEABLE LENSES

BACKGROUND OF THE INVENTION

Many photographic cameras are designed for use with interchangeable lens units (frequently called merely "lenses") and such lens units frequently contain movable elements or parts which are intended to be moved by operating or control mechanism in the camera body. This is frequently accomplished by a control rod in the camera body, parallel to but offset laterally from the optical axis, which control rod is pushed forward to a certain extent by suitable mechanism within the camera body, when it is desired to operate the movable part or element in the lens unit. The lens unit contains a rod aligned with the rod in the camera body, when the lens unit is properly mounted in the camera body, so that the axial motion of the control rod in the camera body is transmitted endwise to the rod in the lens unit, to cause whatever movement is desired in the latter.

Sometimes the lens unit contains an adjustable diaphragm, and the axial movement of the rod is used to adjust the aperture of the diaphragm. Sometimes the lens unit contains an objective shutter (rather than having the shutter in the camera body) and the axial movement of the rod is used to trip the shutter to cause operation thereof. Sometimes the lens unit may contain both an adjustable diaphragm and a shutter, and the camera and associated lens unit may contain two rods, both parallel to each other and to the optical axis and offset from the optical axis, one rod controlling the aperture of the diaphragm and the other rod serving to trip or operate the shutter.

There are, of course, no difficulties when the camera is used with a lens unit which was specifically designed for that camera. In such a case, the mounting of the lens unit on the camera will bring the lens unit rod or rods into proper axial alignment with the control rod or rods in the camera body, and the extent of axial movement of the rod or rods in the camera body will be proper for the permissible extent of axial movement of the rod or rods in the lens unit.

Difficulties may be encountered, however, when it is attempted to use an interchangeable lens unit which was not specifically designed for that particular camera. The mounts may be somewhat different, either in size or in kind. That is, the camera may be built for a bayonet type connection with the interchangeable lens, whereas the lens that one wishes to use may have a screw mount rather than a bayonet type mount. Or even if the mount on the camera and on the lens unit are of the same kind, they may be of different diameters. But in addition to this, there is the further problem that, assuming the use of a proper adapter to enable the lens mount to be mounted on the camera, the control rod or push rod in the camera body may not line up accurately with the push rod in the lens unit. Moreover, there is the further problem that the control rod or push rod in the camera body may have a greater range of axial travel than the push rod in the lens unit, so that any attempt to operate the control rod through its normal range of movement may result in breaking or damaging the delicate parts in the lens unit.

An object of the present invention is to provide an adapter ring so designed as to enable the use of an interchangeable lens unit with a camera for which it was not specifically designed, and especially to enable the motion of a control rod in the camera body to be transmitted to a push rod in the lens unit, even though the two rods may not be in perfect axial alignment with each other when the interchangeable lens unit is mounted on the camera body, and even though the permissible range of axial movement of the push rod in the lens unit may be less than the range of travel of the push rod in the camera body.

Another object is the provision of such an adapter ring, of simple and sturdy form, easily and inexpensively manufactured, and easy to use.

These objects and other advantages are achieved as a result of the fact, among others, that the coupling means of the present adapter ring comprises at least one pair of transmission rings situated inside the main adapter ring, and that the rings of this pair can be pressed against each other in opposition to the force of a spring, this force being selected slightly in excess of the impacting power required for displacement of the diaphragm adjusting push rod or for release of the shutter, when the push rod is used to trip or release the shutter drive. The pair of rings performs the function of an intermediate transmission element between the two push rods, and thus compensates the displacement caused in the peripheral direction between the push rod of the lens unit and the push rod of the camera, by the insufficient distance to which the lens has been screwed into the adapter ring.

The spring action serves as a safeguard against an attempt to operate the diaphragm from the camera for the purpose of selecting a very small aperture for which no provision is made in this particular lens unit, and also as a means of compensating excess travel of the push rod of the camera.

An adapter ring of this kind offers the advantage that it is not necessary for specially designed coupling devices to be employed each time that a certain replacement lens has to be fitted to a certain camera. On the contrary, this adapter is of a universal type, enabling a driving connection to be obtained between a large number of types or kinds of interchangeable lenses with various types or kinds of cameras.

In a preferred embodiment of the invention, the transmission rings are rotatably mounted at a point in the adapter ring, and an excess stroke spring is provided between them, preferably in the zone of application of the lens unit push rod and the camera push rod.

In a particularly suitable version of the invention, the pairs of transmission rings each comprise two spring members which are pivotally affixed at a common point in the main adapter ring, in such a way that they can be moved into exactly the same position, and which are interconnected to each other, preferably rigidly, at the said securing point and are resiliently bent away from each other in the zone of application of the lens push rod and the camera push rod.

DESCRIPTION OF THE PREFERRED EMBODIMENTS

Figure 1:
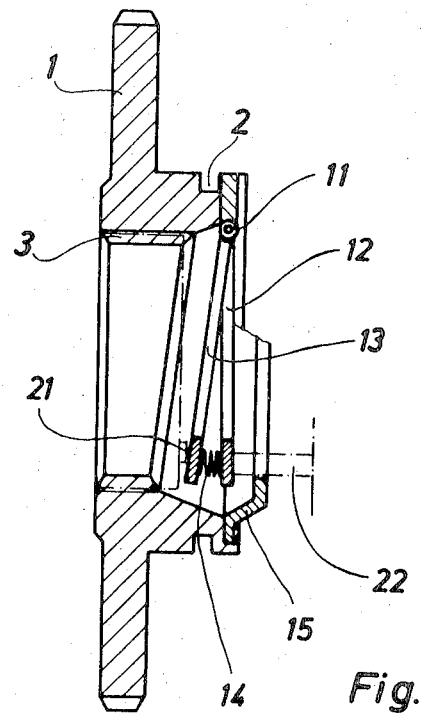
FIG. 1 is an axial sectional view taken diametrically through one form of adapter ring according to the present invention.

Referring first to the form of the invention shown in FIG. 1, the main adapter ring is indicated at 1. One side of this ring (the right hand side in FIG. 1) has a suitable formation for mating with the mounting parts of the camera body with which it is designed to be used, such as screw threads, or a bayonet type connection, conventional bayonet grooves being here shown at 2. The other side of the adapter ring 1 (the left hand side in FIG. 1) is provided with suitable conventional mating parts for mating with the mounting parts on the rear end of the lens unit (hereafter for brevity referred to merely as the lens) with which it is to be used. If the lens has screw threads for mounting, the ring 1 will have screw threads as shown at 3, for receiving the screw threads of the lens. If the lens is constructed for bayonet type mounting, the ring 1 would have a bayonet socket at this point.

The interchangeable lenses to be used with this adapter are provided with a push rod projecting somewhat from the rear end of the lens, as indicated at 21. This push rod may serve, as already indicated above, for adjustment of the aperture of the diaphragm of the lens, or for operation of an objective shutter incorporated in the lens unit, or there may be two rods, one for each purpose. In any event, the push rod or rods are intended to interact with a corresponding push rod or rods axially movable in the camera housing, one such rod being indicated at 22, thus enabling the movable parts in the lens to be controlled or operated from the camera side.

The transmission connection between the push rods 21 and 22 is provided, in the embodiment illustrated in FIG. 1, by two transmission rings 12 and 13 swingably mounted at a point 11 in the adapter ring 1, so that they may swing toward and away from each other independently of each other. At a point approximately diametrically opposite the pivotal mounting 11, in the zone of application of the lens push rod 21 and camera push rod 22, the rings are held apart by an excess stroke spring 14, designed in such a way that it cannot be compressed until a force a little greater than the force required for closing the diaphragm down to its smallest aperture or for releasing the shutter is applied. The excess stroke spring thus acts as a fixed connecting device when the push rod 22 of the camera is actuated, to transmit the same axial movement to the push rod 21 of the lens, unless and until excess resistance is encountered. Only when the lens push rod 21 meets resistance greater than its normal resistance during its normal operating stroke, will the further operation of the camera push rod 22 cause compression of the excess stroke spring 14, thus compensating for the differences in length of travel between the push rods 21 and 22. The extent to which the two rings 12 and 13 can oscillate about the bearing point or pivot point 11 is limited on the camera side by the securing cap 15.

Figure 2A:
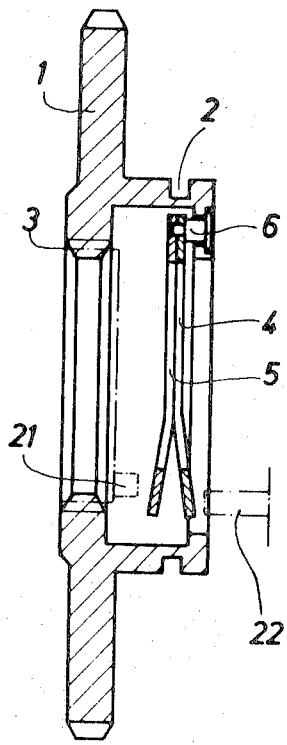
FIG. 2a is a similar section through a second embodiment of the invention, showing the parts before the camera push rod has been operated.
Figure 2B:
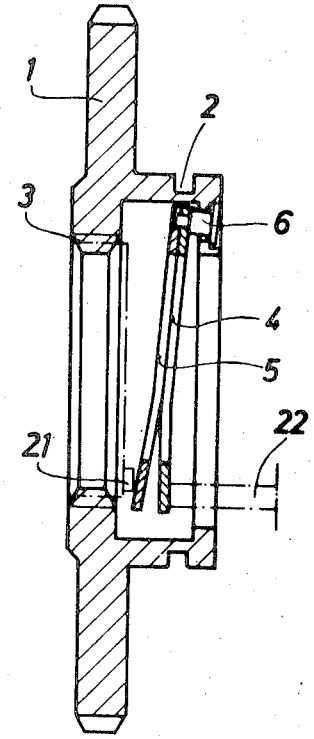
FIG. 2b is a similar view showing the position of the parts after the camera push rod has been operated, and showing how it compensates for the excess length of stroke of the camera push rod.

A second embodiment of the invention is illustrated in FIGS. 2a and 2b, to which reference is now made. Here, the transmission between the camera push rod 22 and the lens push rod 21 is accomplished by providing a coupling or transmission element comprising two congruent spring rings 4 and 5, connected to each other (preferably but not necessarily rigidly) at the point 6, and pivotally or loosely connected at this point 6 to the interior of the main adapter ring 1. These two rings 4 and 5 are made of resilient material, and at the edge opposite to the connection 6 (that is, in the zone of application of the push rods 21 and 22) the two spring rings are bent apart from each other, as illustrated. Just as in the case of the excess stroke spring 14 in FIG. 1, the degree of resilience of the members 4 and 5 is so chosen that the separated edges of the members 5 will not be displaced appreciably toward each other until the force applied is slightly greater than the normal force necessary to move the lens push rod 21 through its normal travel. But when the lens push rod 21 reaches the end of its travel or otherwise meets increased resistance, then any further axial movement of the camera push rod 22 is taken up by flexure of the resilient rings 4 and 5, the separated edges of these rings moving closer toward each other, as illustrated in FIG. 2b.

The operation of both forms of the invention is thought to be clear from what has been said above, but may be summarized as follows.

The adapter ring 1 has a large radially extending flange, the circumferential periphery of which is knurled or serrated for easy grasping, and the interchangeable lens is screwed into threaded opening at the left side of the ring 1, if the lens is of the screw mounted type, or is suitably connected to the bayonet mating parts at the left end of the adapter ring if the lens is of the bayonet mounted type. The right end or rear end of the adapter ring is then suitably mounted on the camera body, by bayonet mating parts or by screw threads, depending upon the type of mounting at the front of the camera body, and of course on the type of mounting on the adapter ring which must mate therewith. It does not matter whether the lens is mounted on the adapter ring before or after the adapter ring is mounted on the camera body.

After the mounting of the lens and adapter ring on the camera body, the lens push rod 21 and the camera push rod 22 are not yet tightly operatively connected to each other, in most cases there being some play between them and the transmission mechanism, as illustrated in FIG. 2a. The transmission rings 4 and 5 are still able to swing to a limited extent about the securing point 6. Not until the camera push rod 22, by being operated by the operating mechanism in the camera, has overcome the clearance, will the push rods 21 and 22 be operatively connected to each other. Thereafter, the operating force of the push rod 22, transmitted to the transmission ring 4, will displace this ring 4 and with it the companion transmission ring 5, bringing the latter into contact with the rear end of the lens push rod 21. Thereafter, further forward movement of the camera push rod 22 will be transmitted, through the elements 4 and 5, to the lens push rod 21 without the bent parts of the elements 4 and 5 being pressed together to any appreciable extent, so long as only the normal resistance is encountered. The lens diaphragm is thus adjusted, assuming that the lens push rod 21 controls the diaphragm aperture, or the shutter in the lens unit is tripped to make an exposure, assuming that the lens push rod 21 controls the shutter release.

FIG. 2b illustrates how, with the push rod 21 completely pushed to the limit of its travel, i.e., with the diaphragm completely closed or with the shutter released, any excess stroke from the camera push rod 22 is compensated by the pressing together or flexure of the two bent parts of the transmission rings 4 and 5. If the distances travelled by the push rod on the lens side and the push rod on the camera side are not completely coordinated, therefor, the spring action between the two bent parts of the spring rings 4 and 5 will prevent the breakage or damage of any driving parts in the camera body or the lens unit, which might be caused by further forcing of the push rod 22 from the camera side. Similar protective action occurs in the embodiment shown in FIG. 1, by compression of the spring 14.

The adapter ring 1, with coupling elements 4, 5, 6 (FIGS. 2a and 2b) or with coupling elements 11, 12, 13, 14 (FIG. 1) either enables the lens push rod and the camera push rod to be mechanically interconnected for diaphragm adjustment, or enables the shutter release device of the camera body and the shutter release member within the lens unit to be mechanically interconnected. If both actions are to be performed, the adapter ring may contain a second set of coupling elements, constructed in the same manner.

The adapter ring, by means of the annular coupling elements, also provides for a driving connection between the push rods 22 and 21 when they are not perfectly aligned with each other. The camera push rod and the lens push rod may be at slightly different distances from the optical axis, or may be spaced from each other slightly in a circumferential direction, but in either case the operative connection is made by the parts as illustrated.

There are further ways in which the lens adapter ring of the present invention can be used for the transmission of movements of the lens push rod and camera push rod. For example, instead of transmitting motion from a push rod in the camera to a push rod in the lens, the transmission can take place in a reverse direction, the push rod in the lens serving to push against and control the movement of a push rod in the camera. This is useful, for example, when a particular diaphragm aperture set in the lens is to be sensed or felt by the mechanism in the camera, in order to control a shutter speed setting to be made in the camera or to control a follow-up pointer of a light meter, or for other known purposes.

It has been mentioned above that a force a little greater than that required for closing the diaphragm to minimum aperture or for tripping the shutter must be applied before the excess stroke spring 14 is compressed or the separated edges of the resilient transmission members 4 and 5 are flexed appreciably toward each other. The amount of this excess force is, of course, subject to variation, but it is usually found that satisfactory results are achieved if the parts are designed for compression or flexure under a force of about 20 grams more than the force required to operate the diaphragm or the shutter.

Reference is made to Mito patent 3,500,735 of Mar. 17, 1970, showing other forms of adapters for the same general purpose as the present invention, but of quite different construction.

What is claimed is:

1. A lens adapter ring for mounting an interchangeable lens unit of the type having an optical axis and a push rod axially movable in a direction parallel to said optical axis, on a camera of the type having an optical axis and a push rod axially movable in a direction parallel to the optical axis of the camera, said adapter ring comprising a hollow body having one side formed for attachment to a camera and an opposite side formed for attachment to a lens unit, and two transmission rings mounted in said body, said two transmission rings having portions which are resiliently separated from each other in the direction of said optical axes of the lens unit and the camera when such axes are aligned with each other, a separated portion of a first one of said transmission rings being in position to be engaged and displaced axially by axial movement of the push rod of the camera, a separated portion of the other transmission ring being in position to be engaged by and to transmit axial movement to the push rod of the lens unit when the separated portion of said other ring is displaced axially as a result of axial displacement of the first transmission ring by the push rod of the camera.

2. An adapter ring as defined in claim 1, in which said separated portions of said transmission rings are held substantially at a fixed distance from each other during transmission of operating force from one push rod to the other push rod, and said separated portions move axially closer to each other only upon application of axial force greater than said operating force.

3. An adapter ring as defined in claim 2, in which said transmission rings are two separate rings pivotally mounted for swinging movement toward and away from each other, and an excess stroke spring (14) tending to keep the portions of said rings engaged by said push rods at a predetermined distance from each other.

4. An adapter ring as defined in claim 2, in which said transmission rings are made of resilient material, portions of the two rings lying against each other, other portions of the two rings being shaped to be axially separated from each other in the regions engaged by said push rods.

5. An adapter ring as defined in claim 2, in which said transmission rings are two rings of resilient material tightly connected to each other at one edge and loosely mounted at that edge for limited swinging movement within said mounting body, said rings having areas near said edge lying substantially tightly against each other and having other areas remote from said edge which are spaced from each other in an axial direction and which are adapted to be engaged by the push rods of the camera and the lens unit, respectively.

* * * * *

UNITED STATES PATENT AND TRADEMARK OFFICE
CERTIFICATE OF CORRECTION

PATENT NO. : 3,838,437
DATED : September 24, 1974
INVENTOR(S) : Heinz Hamm

It is certified that error appears in the above–identified patent and that said Letters Patent are hereby corrected as shown below:

In the heading of the patent, item [30], filing date of the second German application, for "Jan. 5, 1972" read --Jan. 5, 1973--.

Signed and Sealed this

Thirtieth Day of October 1979

[SEAL]

Attest:

RUTH C. MASON
Attesting Officer

LUTRELLE F. PARKER
Acting Commissioner of Patents and Trademarks